June 20, 1961 W. C. CARMICHAEL 2,988,956
AUXILIARY SPECTACLES
Filed May 11, 1959
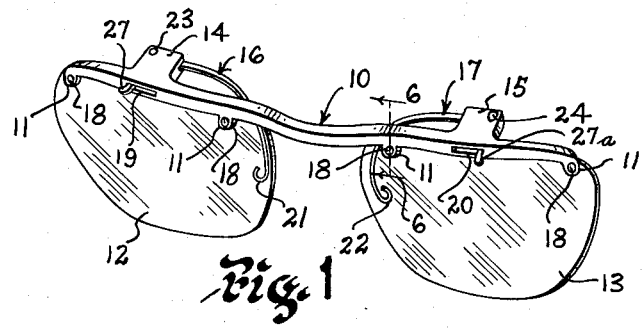
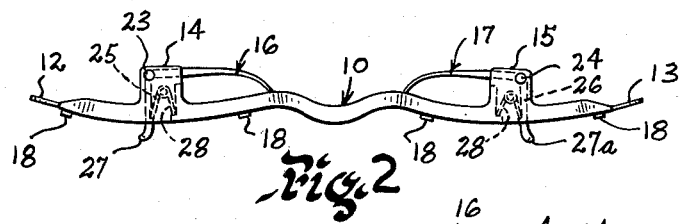
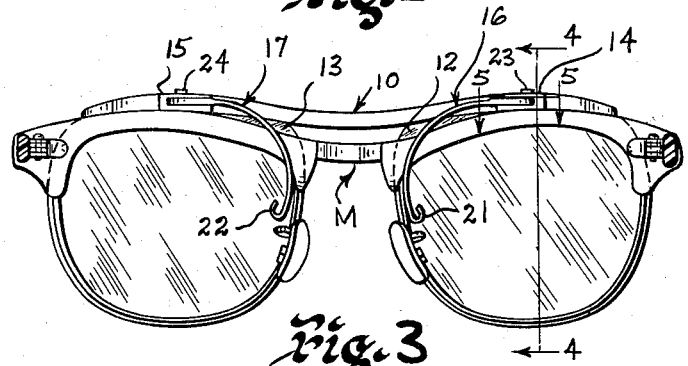
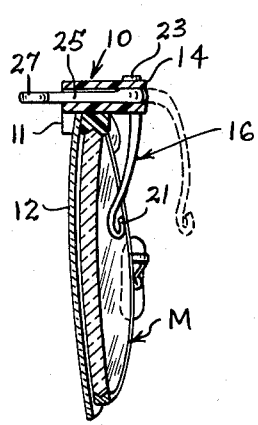
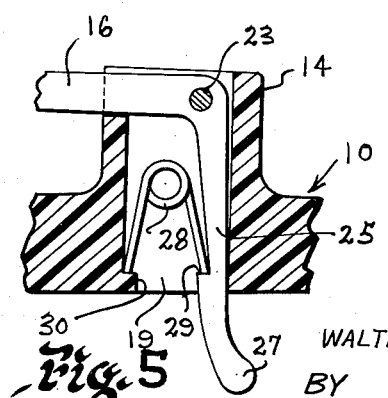
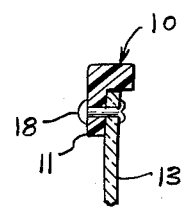
INVENTOR
WALTER C. CARMICHAEL
BY
Louis L. Gagnon
ATTORNEY

United States Patent Office 2,988,956
Patented June 20, 1961

2,988,956
AUXILIARY SPECTACLES
Walter C. Carmichael, Lexington, Mass., assignor to American Optical Company, Southbridge, Mass., a voluntary association of Massachusetts
Filed May 11, 1959, Ser. No. 812,318
6 Claims. (Cl. 88—41)

This invention relates to auxiliary spectacles or the like which are adapted to be detachably fitted over ordinary ophthalmic mountings and has particular reference to sunglasses of the clip-on type which, when in use, are positioned to cover one side of the lenses of ophthalmic mountings and are detachably held in place by tensioned holding means in engagement with the opposite side of said lenses.

The principal object of this invention is to provide an improved, simple, very inexpensive and lightweight clip-on type of auxiliary spectacle or sunglass to be worn with ordinary ophthalmic mountings.

Another object is to provide a device of the above character which may be readily and quickly detachably fitted to practically any of the various modern shapes or styles of ophthalmic mountings.

Another object is to provide improved resilient clip-on or fastening means for devices of the above character which is specifically designed to permit quick and easy placement of said devices on ordinary ophthalmic mountings with one-hand manipulation of the fastening means and to further permit removal of the same from said ophthalmic mountings in a similar fashion.

Another object is to provide improved clip-on or fastening means for auxiliary spectacles or the like which will, at all times when in use, produce a secure and dependable detachable connection for holding said auxiliary spectacles in place on ophthalmic mountings and prevent rattling or displacement resulting from slippage between said spectacles and mounting.

A further object is to provide auxiliary spectacles of the clip-on type which are pleasing in appearance, extremely light in weight and comfortable to wear when used with ordinary ophthalmic mountings.

Other objects and advantages of the invention will become apparent from the following description when taken in conjunction with the accompanying drawings in which:

FIG. 1 is a perspective view of the device of the invention;

FIG. 2 is a top plan view of said device;

FIG. 3 is a rear elevational view of an ophthalmic mounting shown together with the device of the invention in position of use thereon;

FIG. 4 is an enlarged vertical cross-sectional view taken substantially along line 4—4 looking in the direction of the arrows;

FIG. 5 is a greatly enlarged cross-sectional view taken substantially on line 5—5 of FIG. 3 looking in the direction of the arrows; and FIG. 6 is an enlarged cross-sectional view taken on line 6—6 of FIG. 1 and looking in the direction of the arrows.

Referring more particularly to the drawings wherein like characters of reference designate like parts throughout the several views, the device of the invention embodies an elongated frame bar or lens supporting brow section 10 having spaced pairs of integral depending tab-like parts 11 to which the upper nasal and temporal sides of lenses or the like 12 and 13 are attached. Also formed as integral parts of the brow section 10 are a pair of rearwardly extending slotted thickened portions or projections 14 and 15 within which a pair of spring biased clamp or clip-on arms 16 and 17 are pivotally mounted.

The brow section 10 is preferably formed of a lightweight, rigid and durable plastic material and is contoured, as shown more particularly in FIG. 2, to approximately an average face form shape such as to match the usual coquilling of the frames of conventional ophthalmic mountings. As seen in the drawings, the brow section 10 of the device of the invention is generally relatively small in cross-section and trimly contoured to reduce its weight to a practical minimum and at the same time, enhance the cosmetic appeal of the device.

The lenses 12 and 13 are preferably formed of a lightweight, relatively thin sheet plastic material and are contoured to approximately the general or average shape of the lenses of present-day ophthalmic mountings or, if desired, they may be provided with a specific desired outer contour shape so as to exactly match the shape of the lenses of a particular ophthalmic mounting with which the device of the invention is to be used. It should be understood that the lenses 12 and 13 may be formed of any of the well-known types of material commonly used in the manufacture of sunglass lenses or the like. Furthermore, if desired, the lenses may be formed of a molded clear plastic material or the like of the well-known type used to form plastic prescriptive lenses.

When provided with prescriptive lenses, the device of the invention would be used more specifically as a clip-on auxiliary spectacle adapted to fit over an ophthalmic mounting to provide a user with certain precontrolled visual corrections in addition to those offered by the main prescriptive mounting and be readily and quickly detachable when the wearer does not require such added visual corrections.

Referring more specifically to the details of construction, it can be seen in FIGS. 1 and 6 that the upper edges of the lenses 12 and 13 are attached to the tablike parts 11 of the brow section 10 by rivets 18 which extend through said tab parts 11. The rivets 18 are headed and/or flanged over at their opposite ends. It should be understood, however, that small bolts and nuts or screws or other connecting means may be used to replace the rivets 18 or, if desired, the lenses 12 and 13 may be cemented to the brow part 10. In all cases, the lenses 12 and 13 are preferably mounted so as to space their geometrical centers at a distance substantially equal to an average of the various human inter-pupillary distances so as to render the device of the invention universally adaptable to substantially all sizes of ophthalmic mountings.

The rearwardly extending projections 14 and 15 are provided with slots 19 and 20, respectively, which extend from front to back completely through the brow section 10 and in which the arms 16 and 17 are pivotally mounted under spring tension urging their ends 21 and 22 toward the respective lenses 12 and 13. The arms 16 and 17 are pivotally connected to their respective projections 14 and 15 by pivot pins 23 and 24 and are generally L-shaped with relatively short and rigid lever sections 25 and 26 extending forwardly and outwardly through the slots 19 and 20. The sections 25 and 26 terminate in rounded finger or thumb engagement parts 27 and 27a. From their respective pivot pins 23 and 24, the opposite ends of the arms 14 and 15 extend generally towards each other curving downwardly behind the lenses 12 and 13 adjacent the nasal edges thereof as shown more particularly in FIGS. 1 and 3.

Between the pivot pins 23 and 24 and the ends 21 and 22, the arms 16 and 17 are gradually tapered toward said ends 21 and 22 and rounded in cross-section to render them somewhat resilient particularly in the vicinity of their ends 21 and 22. In order to produce a biasing force on the arms 16 and 17 which tends to constantly resiliently urge their ends 21 and 22 towards the lenses 12 and 13, a spring 28 is placed under tension in each of the slots 19 and 20 with one of its ends bearing against a side wall of its respective slot 19 or 20 and its opposite end bearing against the lever section 25 or 26 of its respective arm 16 or 17. The springs 28 may be formed of coiled spring-tempered wire as shown (see FIG. 5) or they may be of any other type adapted to perform the above-mentioned function. In the case illustrated (see FIG. 5) a notch 29 is provided in each of the sections 25 or 26 of arms 16 and 17 which, along with a projection 30 adjacent the forward opening of each of the slots 19 and 20, acts to prevent the springs 28 from accidentally becoming displaced or slipped out of their respective slots 19 and 20.

By moving the thumb or finger engaging ends 27 and 27a of the arms 16 and 17 toward each other against the tension of the springs 28, the ends 21 and 22 of the arms 16 and 17 will swing in a direction away from the lenses 12 and 13 permitting the device of the invention to be quickly and easily fitted over a regular ophthalmic mounting.

In adapting the device of the invention to an ophthalmic mounting M (see FIGS. 3 and 4), the arms 16 and 17 are extended over the rear of the mounting M with their ends 21 and 22 in engagement with the rear surface of the lenses of the mounting while the lenses 12 and 13 of the device of the invention rest against the front of the mounting substantially as shown in FIG. 4. At the same time the undersides of the projections 14 and 15 are placed against the upper edges of the brow sections or rims of the mounting to properly locate the device vertically on the mounting and by sliding the device laterally slightly as required, the nasal edges of the lenses 12 and 13 are centrally aligned with the nasal section of the mounting M.

It is particularly pointed out that the device of the invention can be quickly and easily applied to ophthalmic mountings while the mountings are being worn simply by grasping the parts 27 and 27a simultaneously with the thumb and preferably the forefinger of one hand and squeezing the parts 27 and 27a toward each other with said thumb and finger to pivot the arms 16 and 17 outwardly away from the lenses 12 and 13 against the tension of the springs 28. With the arms 16 and 17 so pivoted and spaced away from the lenses 12 and 13, the device of the invention is slipped over the ophthalmic mounting by passing the ends 21 and 22 of the arms 16 and 17 downwardly behind the lenses of said ophthalmic mounting.

With the device of the invention properly seated and centered on the mounting as described above, the parts 27 and 27a are released whereupon the action of springs 28 on the arms 16 and 17 will force their respective ends 21 and 22 firmly against the inner surfaces of the lenses of the mounting (see Figs. 3 and 4) and clamp the device of the invention securely in a position of use on the mounting. Removal of the device of the invention from an ophthalmic mounting is accomplished quickly and easily by simply gripping said device with the thumb and finger as just described and squeezing the parts 27 and 27a to move them toward each other thereby swinging the arms 16 and 17 outwardly whereupon the device is lifted up and away from the ophthalmic mounting.

It is pointed out that when the device of the invention is in a position of use on an ophthalmic mounting (see Figs. 3 and 4), the arms 16 and 17 are positioned well out of a user's line of sight and are relatively inconspicuous when the device is viewed from the front.

If desired, the ends 21 and 22 of the arms 16 and 17 may be dipped or otherwise coated with a rubberlike material or provided with a tubular slip-on member of soft material such as rubber or otherwise padded to provide cushioning means between said ends 21 and 22 and the lenses of an ophthalmic mounting when the device of the invention is in a position of use.

From the foregoing, it will be seen that simple, efficient and economical means has been provided for accomplishing all of the objects and advantages of the invention. Nevertheless, it should be understood that various substitutions, omissions or changes in the details of construction may be made without departing from the spirit of the invention as expressed in the accompanying claims and the invention is not to be limited to the exact matters shown and described as only the preferred matters have been given by way of illustration.

Having described my invention, I claim:

1. A device of the character described comprising an elongated brow section, a pair of lenses connected to and depending from said brow section in predetermined spaced relation with each other, a pair of separate clamp arms each pivotally mounted on spaced portions of said brow section one above each of said lenses, said pivotal connections comprising vertically disposed pivot pins in perpendicular relation with the plane of the surfaces of the adjacent portions of the brow section on which said clamp arms are mounted, said arms having elongated parts normally extending inwardly and downwardly generally toward each other behind the nasal sides of said lenses while following substantially the outer contour shape of their respective adjacent lenses and means biasing said arms toward said lenses while permitting their swinging in a sidewise direction about the axes of the pivots away from said lenses in opposition to said biasing means.

2. A device of the character described comprising an elongated brow section, a pair of lenses connected to and depending from said brow section in predetermined spaced relation with each other, said brow section having a pair of spaced horizontally disposed transverse slots therethrough one above each of said lenses, a spring-biased clamp arm extending through each of said slots and pivotally connected to said portions of the brow section having the slots therein, said pivotal connections comprising vertically disposed pivot pins in perpendicular relation with said portions, said arms having elongated parts normally extending generally inwardly and downwardly toward each other behind the nasal sides of said lenses while following substantially the outer contour shape of their respective adjacent lenses and said depending parts of said arms being adapted to be swung in a sidewise direction about their pivotal connections away from said lenses in opposition to the action of said spring biasing.

3. An auxiliary spectacle of the character described comprising a pair of lenses, an elongated brow bar secured to said lenses adjacent their top edges, a pair of clamp arms one pivotally connected to spaced portions of said brow section above each of said lenses, said pivotal connections comprising vertically disposed pivot pins in perpendicular relation with said spaced portions, said arms each having relatively rigid lever sections extending forwardly of said pivotal connections and protruding slightly beyond said brow bar to permit finger engagement thereof and having elongated clamping sections extending to the rear of said brow bar inwardly and downwardly relative to said pivotal connections behind each of said lenses and generally toward each other normally in close relation with their adjacent sides of said lenses and spring means associated with said arms functioning to resiliently urge said clamping sections toward said lenses while permitting the swinging of said clamping sections in a sidewise direction away from said lenses by pivoting said arms about their respective pivotal connections with said brow bar.

4. A device of the character described comprising an elongated frame bar having means thereon for mounting lenses, a pair of depending lenses secured adjacent their uppermost edges to said means in predetermined spaced relation with each other, said frame bar having a pair of horizontally disposed transverse slots therethrough each approximately centrally aligned above a respective one of said lenses, a clamp arm extending through each of said slots and pivotally connected to said frame bar by vertically disposed pivot means within said slots, said clamp arms having lever sections extending forwardly from said pivot means throughout the major portion of the transverse length of their respective slots and protruding slightly outwardly through one end thereof to provide finger engaging terminal ends, said clamp arms further having elongated depending sections normally extending outwardly of said slots and rearwardly from said pivot means in directions generally toward each other while curving downwardly and following substantially the inner contour shape of the nasal edges of the respective lenses adjacent thereto and spring means in said slots bearing, under tension, against said lever sections of said arms in such manner as to bias said elongated parts thereof toward said lenses.

5. An auxiliary spectacle adapted to be removably positioned on an ophthalmic mounting, said spectacle comprising an elongated frame bar, a pair of lenses, means securing said lenses to said frame bar in depending relation therewith, said frame bar having a pair of horizontally disposed transverse slots therethrough each approximately centrally aligned above a respective one of said lenses, a clamp arm extending through each of said slots and pivotally connected to said frame bar by vertically disposed pivot means within said slots, said clamp arms having lever sections extending forwardly from said pivot means through the major portion of the transverse length of their respective slots and protruding slightly outwardly through one end thereof to provide finger engaging terminal ends, said clamp arms further having elongated depending sections engageable over the rear side of said mounting, said elongated sections normally extending outwardly of said slots and rearwardly from said pivot means in directions generally toward each other and having portions curving downwardly and following substantially the inner contour shape of the nasal edges of said respective adjacent lenses and spring means in said slots bearing under tension against an inner side wall of said slot and against said lever sections of said arms in such manner as to bias said elongated downwardly curving portions thereof in a sidewise direction toward said lenses wherein, with said elongated portions of said arms extended over the rear side of said mounting and said lenses of said spectacle in engagement with the front side of said mounting, said spring means will function to urge said arms against said rear side of said mounting and securely clamp said auxiliary spectacle on the mounting.

6. A device of the character described comprising an elongated relatively thin but rigid frame bar having means thereon for mounting lenses, a pair of lenses secured adjacent their uppermost edges to said means in depending relation with said frame bar and in predetermined spaced relation with each other, said frame bar having a pair of horizontally disposed transversely extending slotted sections one approximately centrally aligned above each of said lenses, a clamping member extending through each of the slots in said sections and pivotally connected to said frame bar by vertically disposed pivot means within said slots, said clamping members having relatively rigid lever arm portions extending forwardly from said pivot means through their respective slotted sections and terminating with finger engaging ends protruding slightly and forwardly of said frame bar, said clamping members further having flexible elongated portions normally extending rearwardly of said slotted sections from said pivot means in directions curving downwardly generally toward each other behind said lenses and following approximately the inner contour shape of the nasal edges of the respective lenses and spring means in said slotted sections bearing under tension against said lever arm portions of said clamping members in such manner as to spring bias said flexible elongated parts thereof normally toward said lenses while permitting swinging of the same in a sidewise direction away from said lenses.

References Cited in the file of this patent

UNITED STATES PATENTS

| | | |
|---|---|---|
| 1,614,827 | Coats | Jan. 18, 1927 |
| 1,749,676 | Sadler et al. | Mar. 4, 1930 |
| 2,132,346 | Richards | Oct. 4, 1938 |
| 2,516,764 | Ehlert et al. | July 25, 1950 |
| 2,574,749 | Mendelsohn | Nov. 13, 1951 |